United States Patent
Chang

(10) Patent No.: US 7,852,576 B2
(45) Date of Patent: Dec. 14, 2010

(54) LENS MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 293 days.

(21) Appl. No.: 12/142,157

(22) Filed: Jun. 19, 2008

(65) Prior Publication Data

US 2009/0128932 A1    May 21, 2009

(30) Foreign Application Priority Data

Nov. 15, 2007    (CN) .................. 2007 1 0202550

(51) Int. Cl.
*G02B 7/02* (2006.01)
(52) U.S. Cl. .................. 359/819; 359/815; 359/820
(58) Field of Classification Search .................. 359/811, 359/813, 819–822
See application file for complete search history.

(56) References Cited

U.S. PATENT DOCUMENTS

| 4,841,358 | A | * | 6/1989 | Kammoto et al. | ........... 358/512 |
| 6,754,243 | B2 | * | 6/2004 | Missey et al. | .................. 372/20 |
| 6,967,785 | B2 | | 11/2005 | Makii et al. | |

FOREIGN PATENT DOCUMENTS

CN    101059592 A    10/2007

OTHER PUBLICATIONS

Li wen-jun et al., Micro-opto-electro-mechanical System and Its Application, Mcrofabrication Technology, 2001 No. 3, pp. 1-8 and 13.

* cited by examiner

*Primary Examiner*—Scott J Sugarman
*Assistant Examiner*—Brandi N Thomas
(74) *Attorney, Agent, or Firm*—Andrew C. Cheng

(57) ABSTRACT

A lens module includes a base, a carrier carrying a lens, two elastic members attached on the base and supporting the carrier, and a number of thermal actuators. The carrier is movable relative to the base. The thermal actuators each have a first arm and a second arm. The first and second arms are aligned in an optical axis direction of the lens and each have a first end electrically and mechanically coupled to the base and a distal end, the distal ends thereof are interconnected and attached to the carrier. The first arms are thinner than the second arms so that the first arms are capable of deflecting toward the second arms due to differential heat generated when an electrical current is passed through the first and second arms from the first ends thereof to the second ends thereof, thereby the carrier is moved.

9 Claims, 3 Drawing Sheets

LENS MODULE

BACKGROUND

1. Technical Field

The present invention relates to lens modules, and particularly, to a lens module with a driving mechanism for a single lens.

2. Description of Related Art

With the ongoing development of microcircuitry and multimedia technology, cameras, including, e.g., still cameras and digital cameras are now in widespread use and are being combined with various electronic devices. These cameras are often required to have auto focusing or zooming functions.

Lens modules are key components of the cameras. Nowadays, driving mechanisms, such as step motors, have been integrated in the lens modules for driving the lenses to move, thereby achieving the auto focusing or zooming functions. However, the step motor is relatively bulky and heavy if it is applied for a single lens, and, in addition, the step motor consumes a substantial amount of power, especially relative to the amount of power that can be stored in a typical battery system of a camera or an electronic device.

What is needed, therefore, is a lens module which has a simple and energy-efficient driving mechanism for a single lens.

SUMMARY

An exemplary lens module includes a lens, a base, a carrier carrying the lens, two elastic members and a number of thermal actuators. The two elastic members each have a first end attached on the base and an opposite second end, the second ends thereof are attached to opposite sides of the carrier to the lens, the carrier being movable relative to the base. The thermal actuators each have a first arm, and a second arm alongside the first arm. A gap is defined between the first and second arms. The first and second arms of the thermal actuators are aligned in a direction along an optical axis of the lens, and each have a first end electrically and mechanically coupled to the base and a second end, the second ends of the first and second arms are interconnected and attached to the carrier. The first arms are thinner than the second arms so that the first arms are capable of deflecting toward the second arms in the direction along the optical axis of the lens due to differential heat generated when an electrical current is passed through the first and second arms from the first ends thereof to the second ends thereof, such that the carrier together with the lens is moved in the direction along the optical axis of the lens.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

Embodiments of the present lens module will now be described in detail below and with reference to the drawings.

Figure 1:
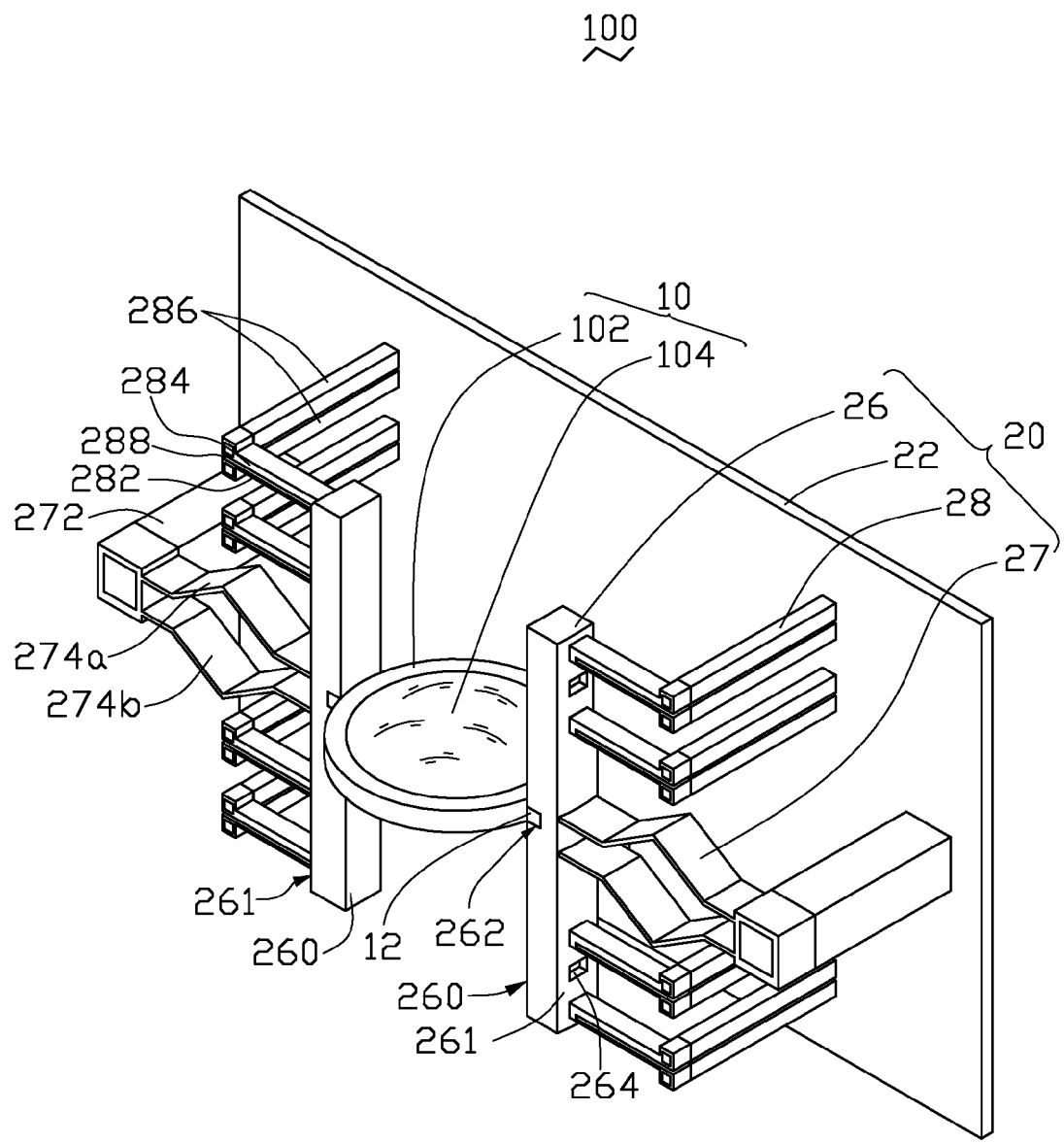
FIG. 1 is a schematic view of a lens module in accordance with a first embodiment of the present invention.

Referring to FIG. 1, an exemplary lens module 100 in accordance with a first embodiment, is provided. The lens module 100 includes a first lens 10, and a driving mechanism 20 for the first lens 10.

The first lens 10 can be made of plastic or glass. The first lens 10 includes a central active portion 102 and a peripheral inactive portion 104 surrounding the central active portion 102. The central active portion 102 can be in a spherical or aspherical shape, and light is able to pass through the central active portion 102. The peripheral inactive portion 104 has two anchors 12 at opposite sides of an outer wall thereof.

The driving mechanism 20 includes a base 22, a carrier 26, two elastic members 27 and a number of thermal actuators 28.

The base 22 is made of silicon or polysilicon, and in a plane substrate shape. A circuit can be printed in the base 22. The carrier 26 is comprised of two elongated rectangular columns. The elongated rectangular columns of the carrier 26 are arranged opposite to each other, with two surfaces 260 thereof facing each other and two surfaces 261 thereof facing apart from each other. Two recesses 262 are defined in the surfaces 260 respectively, and a number of holes 264 are defined in the surfaces 261 respectively. The two anchors 12 of the first lens 10 are received in the respective recesses 262 of the carrier 26. The two elastic members 27 each have a rigid portion 272 attached on the base 22, and an elastic portion 274. The elastic portions 274 each are composed of two flexural strips 274a, 274b. The two flexural strips 274a, 274b are opposite to and spaced apart from each other. The two flexural strips 274a, 274b are attached to the respective two elongated rectangular columns. In this way, the two carriers 26 together with the first lens 10 are suspended and movable relative to the base 22.

The thermal actuators 28 constitute two thermal actuator arrays arranged on the surfaces 261 of two elongated rectangular columns of the carrier 26. Each of the thermal actuators 28 has a first arm 282, a second arm 284 and two beams 286. The second arm 284 is alongside the first arm 282, and a gap 288 is defined between the first and second arms 282, 284. The first and second arms 282, 284 aligned in a direction along an optical axis of the first lens 10, and each have a first end and a second end. The first ends of the first and second arms 282, 284 are electrically and mechanically coupled to the base 22 via the two beams 286, the second ends of the first and second arms 282, 284 are interconnected together and inserted into a respective one of the holes 264 of the two elongated rectangular columns of the carrier 26. The first arms 282 are thinner than the second arms 284.

A size of each of the base 22, carrier 26, elastic members 27 and thermal actuators 28 can be designed according to need.

When an electrical current is passed through the first and second arms 282, 284 from the first ends thereof to second ends thereof, heat accumulated in the first arms 282 is larger than that of the second arms 284, the first arms 282 deflects toward the second arms 284 in the direction along the optical axis of the first lens 10 due to the differential heat therein. In this way, the carrier 26 together with the first lens 10 is moved in the direction along the optical axis of the first lens 10. When the electrical current is cut off, the first and second arms 282, 284 return, and the carrier 26 together with the first lens 10 are drawn back under the elastic force of the flexural strips 274a, 274b.

Figure 2:
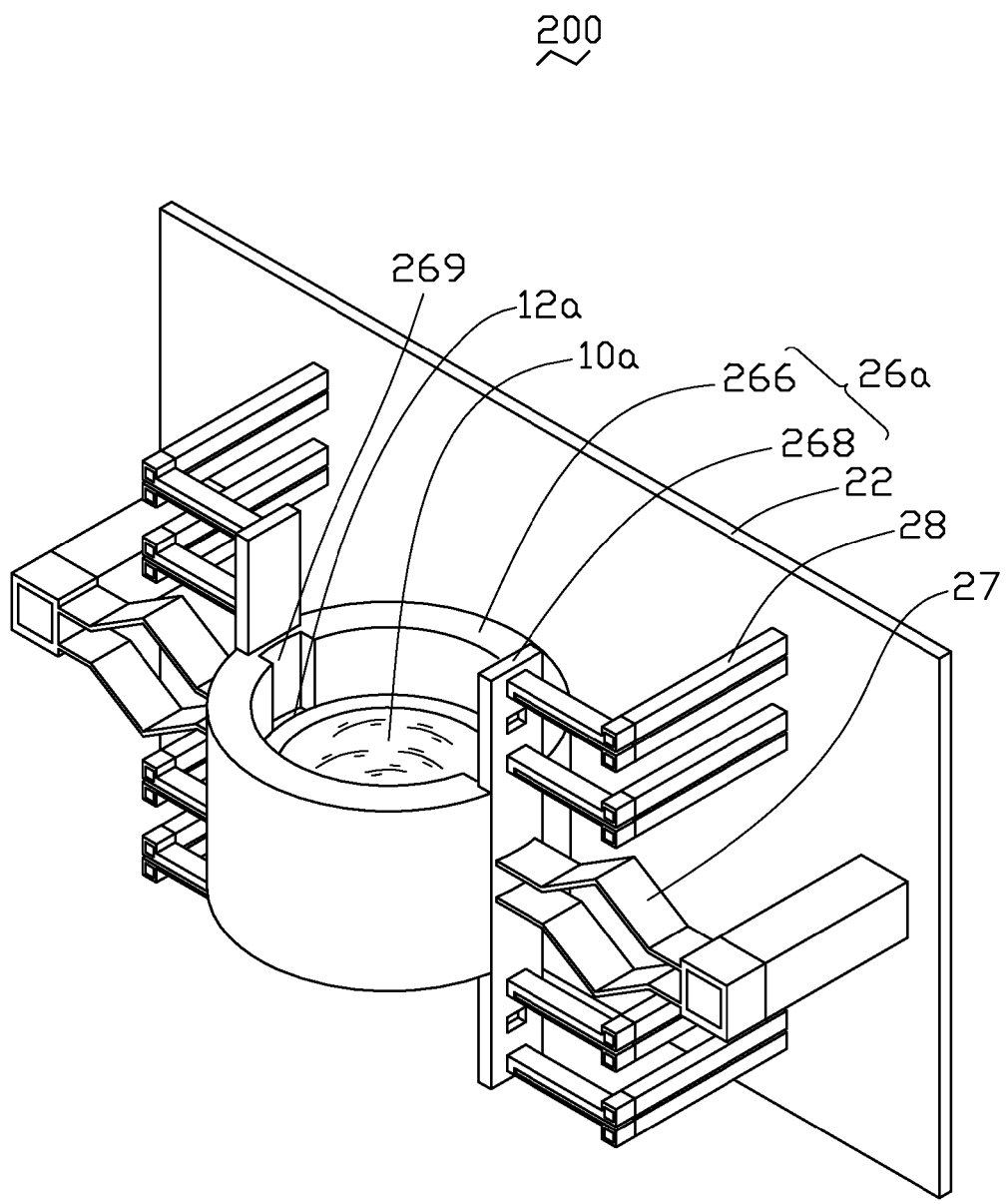
FIG. 2 is a schematic view of a lens module in accordance with a second embodiment of the present invention.

Referring to FIG. 2, an exemplary lens module 200 in accordance with a second embodiment is provided. The lens module 200 is essentially similar to the lens module 100 illustrated above, however, a hollow cylindrical portion 266 and two elongated plate portions 268 connected thereon constitute a carrier 26a for the first lens 10a. Two elongated recesses 269 are defined opposite to each other in an inner wall of the hollow cylindrical portion 266. The two elongated plate portions 268 are arranged on opposite sides of the hollow cylindrical portion 266. The first lens 10a is received in the hollow cylindrical portion 266, with two anchors 12a thereof received in the respective two elongated recesses 269. The elastic members 27 and thermal actuators 28 are attached on the two elongated plate portions 268.

Figure 3:
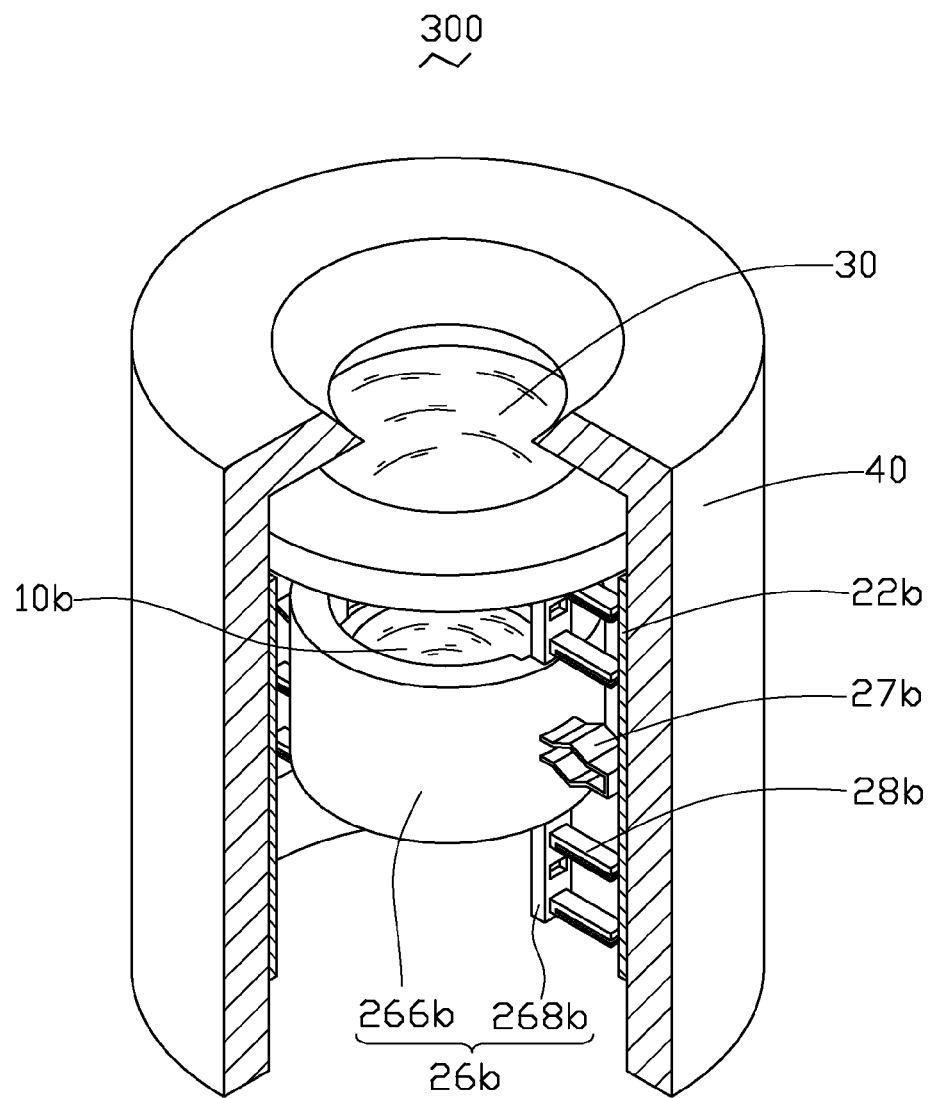
FIG. 3 is a schematic, partially cut-away view of a lens module in accordance with a third embodiment of the present invention.

Referring to FIG. 3, an exemplary lens module 300 in accordance with a third embodiment is provided. The lens module 300 is essentially similar to the lens module 200 illustrated above, however, the base 22b is in a hollow cylindrical shape, the elastic members 27b are attached on an outer wall of the hollow cylindrical portion 266b, and, a second lens 30 and a barrel 40 for receiving all the members are further included. The carrier 26b, the elastic members 27b and the thermal actuators 28b are within the inner wall of the base 22b. The second lens 30 is fixed in the barrel 40. The first lens 10b can be moved relative to the second lens 30, thereby achieving a zooming function.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
    a lens;
    a base;
    a carrier carrying the lens;
    two elastic members each having a first end attached on the base and an opposite second end, the second ends thereof being attached to opposite sides of the carrier, the carrier being movable relative to the base; and
    a plurality of thermal actuators each having a first arm and a second arm alongside the first arm, a gap defined between the first and second arms, the first and second arms aligned in a direction along an optical axis of the lens, and each having a first end electrically and mechanically coupled to the base and an opposite second end, the second ends of the first and second arms being interconnected and attached to the carrier, the first arms being thinner than the second arms so that the first arms are capable of deflecting toward the second arms in a direction along the optical axis of the lens due to differential heat generated when an electrical current is passed through the first and second arms from the first ends thereof to the second ends thereof, such that the carrier together with the lens is moved in the direction along the optical axis of the lens.

2. The lens module as described in claim 1, wherein the lens has a plurality of anchors on an outer wall thereof, the carrier having a plurality of recess receiving the respective anchors.

3. The lens module as described in claim 1, wherein the base is in a plane substrate shape.

4. The lens module as described in claim 1, wherein the base is in a hollow cylindrical shape, and the carrier is suspended within the base.

5. The lens module as described in claim 1, wherein the two elastic members each have a rigid portion attached on the base, and an elastic portion attached to the carrier, the elastic portion being composed of two flexural strips spaced apart from each other.

6. The lens module as described in claim 1, wherein each of the thermal actuators has two beams, the first ends of the first and second arms being electrically and mechanically coupled to the base via the two beams.

7. The lens module as described in claim 1, wherein the thermal actuators constitute two thermal actuator arrays, the two thermal actuator arrays being arranged on the opposite sides of the carrier.

8. The lens module as described in claim 1, wherein the carrier comprises two elongated rectangle columns.

9. The lens module as described in claim 1, wherein the carrier comprises a hollow cylindrical portion and two elongated plate portions arranged on opposite sides of the hollow cylindrical portion, the lens being received in the hollow cylindrical portion, the thermal actuators being attached to the two elongated plate portions.

* * * * *